United States Patent
Hauer et al.

(10) Patent No.: US 10,769,027 B1
(45) Date of Patent: Sep. 8, 2020

(54) QUEUED SCHEDULER

(71) Applicant: ServiceNow, Inc., Santa Clara, CA (US)

(72) Inventors: Sam Hauer, Redmond, WA (US); Scott Stone, Snohomish, WA (US); Ivan Batanov, San Diego, CA (US)

(73) Assignee: ServiceNow, Inc., Santa Clara, CA (US)

(*) Notice: Subject to any disclaimer, the term of this patent is extended or adjusted under 35 U.S.C. 154(b) by 443 days.

(21) Appl. No.: 15/164,124

(22) Filed: May 25, 2016

Related U.S. Application Data

(60) Provisional application No. 62/249,910, filed on Nov. 2, 2015.

(51) Int. Cl.
*G06F 11/14* (2006.01)
*G06F 16/21* (2019.01)

(52) U.S. Cl.
CPC .......... *G06F 11/1461* (2013.01); *G06F 16/21* (2019.01); *G06F 2201/84* (2013.01)

(58) Field of Classification Search
CPC .. G06F 17/30902; G06F 3/0613; G06F 21/56; G06F 12/084; G06F 11/1461
See application file for complete search history.

(56) References Cited

U.S. PATENT DOCUMENTS

| | | | |
|---|---|---|---|
| 2005/0222969 A1 | 10/2005 | Yip et al. | |
| 2013/0117513 A1* | 5/2013 | Brittain | G06F 13/16 711/152 |
| 2013/0173796 A1* | 7/2013 | Grab | H04N 21/25833 709/225 |
| 2014/0089916 A1* | 3/2014 | Gross | G06F 21/80 718/1 |
| 2015/0244775 A1* | 8/2015 | Vibhor | G06Q 10/00 709/203 |

FOREIGN PATENT DOCUMENTS

WO      2002008917      1/2002

* cited by examiner

*Primary Examiner* — Mariela Reyes
*Assistant Examiner* — Courtney Harmon
(74) *Attorney, Agent, or Firm* — Fletcher Yoder PC

(57) ABSTRACT

Systems, apparatuses, and methods for scheduling maintenance jobs for computing assets implementing configuration items within a CMDB are described. The maintenance jobs include database backups. Two queues operate together to schedule a large number of jobs in a technique that is scalable while staying within resource constraints.

20 Claims, 4 Drawing Sheets

QUEUED SCHEDULER

CROSS-REFERENCE TO RELATED APPLICATIONS

This application claims priority to U.S. Provisional Patent Application No. 62/249,910, filed Nov. 2, 2015, the contents of which are incorporated herein in their entirety by reference.

TECHNICAL FIELD

The present disclosure relates in general to scheduling maintenance for configuration items.

BACKGROUND

Networked computing systems allow multiple users and/or multiple companies to share computing resources and data. For example, cloud computing relates to the sharing of computing resources that are typically accessed via the Internet. A large number of servers may be configured to execute various programs, such as application servers, web servers, and/or database servers. Data may be stored for shared access systems, in which a group of users have access to common data for moving, sharing, deleting or editing the data. Maintenance of computing devices, including maintenance involving back up of databases, presents difficulties.

BRIEF DESCRIPTION OF THE DRAWINGS

The description herein makes reference to the accompanying drawings wherein like reference numerals refer to like parts throughout the several views, and wherein.

BRIEF SUMMARY

Figure 1:
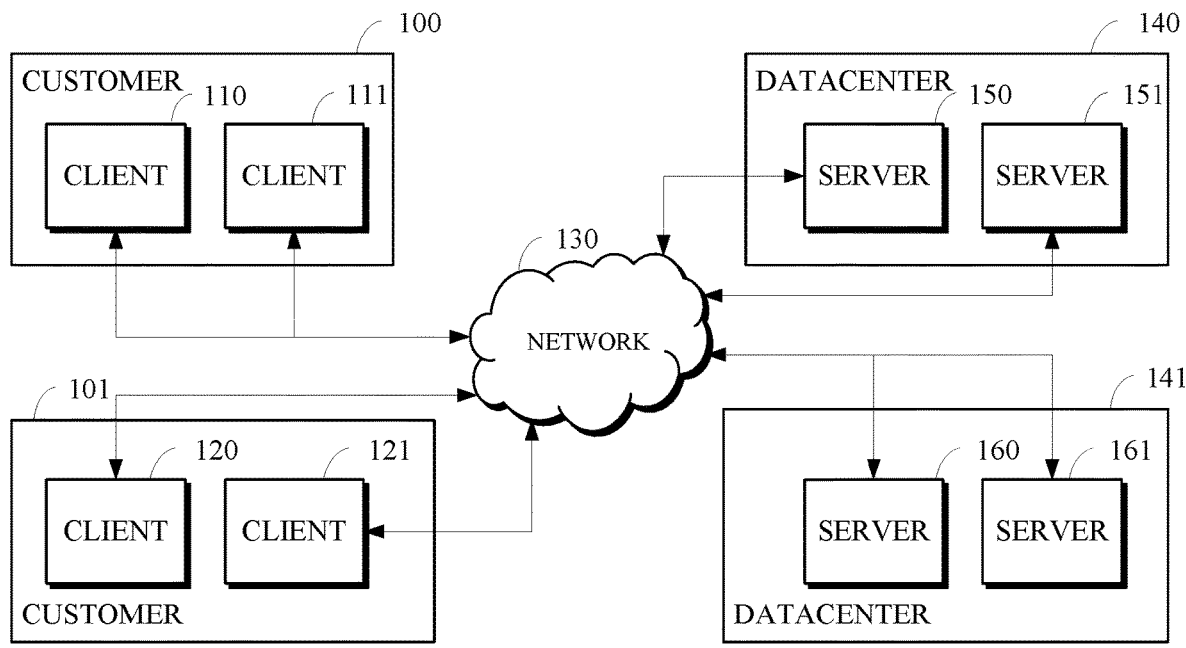
FIG. 1 is a schematic of an example of a computing system.

The scheduler described herein involves the use of queuing technology to optimize resource scarcity and reduce scheduling churn.

One apparatus for maintaining computing assets implementing configuration items within a configuration management database described herein includes memory and a processor. The processor is configured to execute instructions stored in the memory to receive, on a periodic basis, a first queue including maintenance jobs for configuration items within a configuration management database, the first queue initially having a defined order and at least some of the maintenance jobs including a backup job for data stored within a non-transitory storage medium, process the first queue starting with a first queue entry in the defined order, receive, while processing the first queue, at least one maintenance job forming a respective entry within a second queue, the second queue initially ordered by receipt of a request for a maintenance job, and process the second queue in sequence by, for a second queue entry, comparing requirements for performing a maintenance job associated with the second queue entry to conditions occurring within the configuration management database, the conditions occurring within the configuration management database including a status of processing the first queue, when the conditions meet the requirements, performing the maintenance job associated with the second queue entry by copying data stored within a first non-transitory storage medium to a second non-transitory storage medium, and when the conditions do not meet the requirements, moving the second queue entry to the end of the second queue without performing the maintenance job. Processing the second queue defers scheduling of unscheduled maintenance jobs within the first queue until no second queue entries remain within the second queue or the conditions meet the requirements of no second queue entry within the second queue.

A method of maintaining computing assets implementing configuration items within a configuration management database described herein includes receiving, on a periodic basis, a first queue including maintenance jobs for configuration items within a configuration management database, the first queue initially having a defined order and at least some of the maintenance jobs including a backup job, processing the first queue starting with a first queue entry in the defined order by, for the first queue entry within the first queue, comparing requirements for performing the maintenance job associated with the first queue entry to conditions occurring within the configuration management database, when the conditions meet the requirements, performing the backup job of the maintenance job associated with the first queue entry by copying data stored within a first non-transitory storage medium to a second non-transitory storage medium, and when the conditions do not meet the requirements, ending processing of the first queue entry. The method also includes receiving, while processing the first queue, at least one maintenance job forming a respective entry within a second queue, the second queue initially ordered by receipt of a request for a maintenance job, and processing the second queue in sequence by, for a second queue entry within the second queue, comparing requirements for performing a maintenance job associated with the second queue entry to the conditions occurring within the configuration management database, when the conditions meet the requirements, performing the maintenance job associated with the second queue entry, and when the conditions do not meet the requirements, moving the second queue entry of the second queue to an end of the second queue without performing the maintenance job associated with the second queue entry. Processing the second queue defers scheduling of unscheduled maintenance jobs within the first queue until no entries remain within the second queue or the conditions meet the requirements of no entry within the second queue.

Another method of maintaining computing assets implementing configuration items within a configuration management database described herein includes receiving, on a periodic basis, a first queue including maintenance jobs for configuration items within a configuration management database, the first queue initially having a defined order and at least some of the maintenance jobs including a backup job, processing the first queue starting with a first queue entry in the defined order, receiving, while processing the first queue, at least one maintenance job forming a respective entry within a second queue, the second queue ordered by receipt of a request for a maintenance job, and begin processing the second queue unless a backup is occurring while processing the first queue that prevents any backup job associated with the at least one maintenance job within the second queue from occurring. Processing the second queue comprises, for a second queue entry within the second queue, performing the backup job of the maintenance job associated with the second queue entry by copying data stored within a first non-transitory storage medium to a second non-transitory storage medium, and defer scheduling of unscheduled maintenance jobs of the first queue until no entries remain within the second queue or no entry within the second queue can be processed. The defined order may be the same each time the queue is received.

Details of and variations in these implementations, and other implementations, are described hereinafter.

DETAILED DESCRIPTION

Traditional networked computing models often allocate computing resources to a single customer or entity. Distributed computing models, such as cloud computing, can provide advantages over traditional computing models, including the ability to allocate shared resources amongst many different customers. In either case, the computing resources may be used to implement enterprise computing for individual organizations or for other computing processes that involve multiple users transacting with data. The description herein uses cloud computing as an example of the computing systems in which the teachings herein may be implemented, but this is not a requirement. Other networks computing systems may be used, including local area networks, wide area networks, etc.

Computing resources of a cloud computing infrastructure may be allocated using a multi-tenant or a single-tenant architecture. Under a multi-tenant architecture, installations or instantiations of application, database, and/or other software application servers may be shared amongst multiple customers. For example, a single web server (e.g., a unitary Apache installation), application server (e.g., unitary Java Virtual Machine) and/or a single database server catalog (e.g., a unitary MySQL catalog) may handle requests from multiple customers. In a multi-tenant architecture, data or applications used by various customers can be commingled or shared. In an implementation of this architecture, the application and/or database server software can distinguish between and segregate data and other information of the various customers using the system. For example, database records belonging to a particular customer may be identified using a customer_id field in a database table holding records for numerous customers.

Under a single-tenant infrastructure, separate web servers, application servers, and/or database servers are created for each customer. In other words, each customer will access its dedicated web server(s), will have its transactions processed using its dedicated application server(s), and will have its data stored in its dedicated database server(s) and or catalog(s). In a single-tenant architecture, physical hardware servers may be shared such that multiple installations or instantiations of web, application, and/or database servers may be installed on the same physical server. Each installation may be allocated a certain portion of the physical server resources, such as RAM, storage, and CPU cycles.

In an exemplary implementation, a customer instance is composed of multiple web server instances, application server instances, and database server instances. As previously described, each of these server instances may be located on different physical servers and each of these server instances may share resources of the different physical servers with a number of other server instances associated with other customer instances. The web, application, and database servers of the customer instance can be allocated to different datacenters to facilitate high availability of the applications and data provided by the servers. There may be primary web servers and application servers in a first datacenter and backup web servers and application servers in a second datacenter. There may be at least a primary database server in the first datacenter and a second database server in the second datacenter. The primary database server can replicate data to the secondary database server. The cloud computing infrastructure can be configured to direct traffic to the primary web servers, which can be configured to utilize the primary application servers and a primary database server(s) respectively. In a failure scenario, the secondary servers may be converted to primary servers.

The application servers can include a platform application, such as one written in Java, for example, that provides generic platform functionality for accessing the database servers, integrating with external applications, and rendering web pages and other content to be transmitted to clients. The generic platform functionality may be configured with metadata stored in the database server. In other words, the operation of the platform on the application server may be customized by certain end-users of the platform without requiring the Java code of the platform application to be changed. The database server instances can be configured with a database configuration and schema to facilitate the operation of the platform. For example, the database server instance can be configured with various tables for storing metadata about applications, tables/fields, menus, forms, business rules, scripts, and custom user interface (UI) elements that are used to customize the appearance and operation of the customer instance. In some implementations, the application servers can include web server functionality and the web servers can be omitted.

In a given cloud infrastructure system, different implementations of customer instances may be used for different customer instances at the same time. Other configurations and implementations of customer instances may also be used.

Resource scarcity and scaling can be problems when scheduling maintenance jobs that are or include backup jobs. That is, the resources required for such jobs and the planning of the jobs are simple when the number of jobs are few. When the number of jobs increases, the number of computing devices required for the backup jobs increases, which can result in resource scarcity. Resource scarcity can also result as the number of customer database instances increases. Further, a simple first-in-first-out (FIFO) queue that specifies a start time is not scalable to a large number of jobs. A given backup job may be re-scheduled multiple times in a 24-hour period, for example. In this case, the job may not be run when no set of conditions is met within the 24 hour period that would allow the backup to run at each consideration for the job.

According to the teachings herein, at least two queues are managed by a queued scheduler. In this example, two queues, a periodic queue and an ad-hoc queue, are discussed. The periodic queue is populated periodically, such as once per day at a start of a backup window. The start of the backup window may be configurable by a user, such as a system operator or technician. The periodic queue may be populated based on one of a set of algorithms. Any backup job in the periodic queue may then run when resource constraints permit. If a backup job from the periodic queue fails, it will be re-queued, e.g., at the end of the periodic queue for retry. The second queue in this example is an ad-hoc queue, which allows backup jobs to be scheduled on an as-needed basis. Jobs added to the ad-hoc queue can be run based on resource constraints run before any job in the periodic queue. Any backup job from the ad-hoc queue that fails will be re-queued, e.g., at the end of the ad-hoc queue for retry. A queued scheduler according to one example of the teachings herein is discussed in additional detail below after a description of the environment in which implementations of the invention may be incorporated.

FIG. 1 is a schematic of an example of a computing system in which the teachings herein may be implemented. As explained previous, the example of a cloud computing system is used. The cloud computing system can include two customers 100 and 101. Each customer may have clients, such as clients 110, 111 for customer 100 and clients 120, 121 for customer 101. Each of clients 110, 111, 120, 121 can be in the form of a computing system including multiple computing devices, or in the form of a single computing device, for example, a mobile phone, a tablet computer, a laptop computer, a notebook computer, a desktop computer, and the like. The customers and clients shown are exemplary, and a cloud computing system may have a different number of customers or clients or may have a different configuration of customers or clients. For example, there may be hundreds or thousands of customers and each customer may have any number of clients.

The cloud computing system can include two datacenters 140 and 141. Each datacenter may have servers, such as servers 150, 151 for datacenter 140 and servers 160, 161 for datacenter 141. Each datacenter may represent a different location where servers are located, such as a datacenter facility in San Jose, Calif. or Amsterdam, Netherlands. Each of servers 150, 151, 160, 161 can be in the form of a computing system including multiple computing devices, or in the form of a single computing device, for example, a desktop computer, a server computer and the like. The datacenters and servers shown are exemplary, and a cloud computing system may have a different number of datacenters and servers or may have a different configuration of datacenters and servers. For example, there may be tens of data centers and each data center may have hundreds or any number of servers.

Clients 110, 111, 120, 121 and servers 150, 151, 160, 161 may be configured to connect to network 130. The clients for a particular customer may connect to network 130 via a common connection point or different connection points. Network 130 can, for example, be the Internet. Network 130 can also be or include a local area network (LAN), wide area network (WAN), virtual private network (VPN), or any other means of transferring data between any of clients 110, 111, 120, 121 and servers 150, 151, 160, 161. Network 130, datacenters 140, 141, and/or blocks not shown may include network hardware such as routers, switches, load balancers, and/or other network devices. For example, each of datacenters 140, 141 may have one or more load balancers for routing traffic from network 130 to various server such as servers 150, 151, 160, 161. Some or all of clients 110, 111, 120, 121 and servers 150, 151, 160, 161 may be used to implement a configuration management database (CMDB). A CMDB can include a number of Configuration items (CI) each of which relates to one or more information technology assets.

Other implementations of the exemplary cloud computing system are also possible. For example, devices other than the clients and servers shown may be included in the system. In an implementation, one or more additional servers may operate as a cloud infrastructure control, from which servers and/or clients of the cloud infrastructure are monitored, controlled, and/or configured. For example, some or all of the techniques described herein may operate on said cloud infrastructure control servers. Alternatively or in addition, some or all of the techniques described herein may operate on servers such as servers 150, 151, 160, 161. Although discussed in the architecture of a cloud computing system by example, the teachings herein may be implemented by an individual organization with their own servers and network connections to users.

Figure 2:
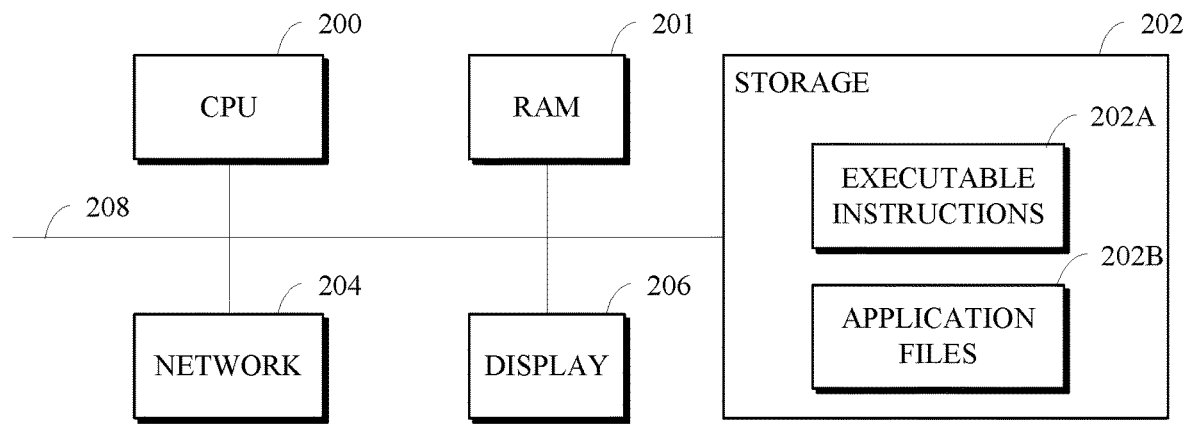
FIG. 2 is a block diagram of an example internal configuration of a client or server of the computing system of FIG. 1.

FIG. 2 is a block diagram of an example internal configuration of a client or server of the system of FIG. 1. As previously described clients or servers may take the form of a computing system including multiple computing devices, or in the form of a single computing device, for example, a mobile phone, a tablet computer, a laptop computer, a notebook computer, a desktop computer, a server computer and the like. This structure is also applicable to traditional networked computing resources.

The internal configuration can include CPU 200, RAM 201, storage 202, network 204, display 206, and bus 208. CPU 200 can be a conventional central processing unit. CPU 200 can include single or multiple processors each having single or multiple processing cores. Alternatively, CPU 200 can include another type of device, or multiple devices, capable of manipulating or processing information now-existing or hereafter developed.

RAM 201 can be Random Access Memory or any other suitable type of storage device can be used as memory. RAM 201 can include executable instructions and data for immediate access by CPU 200. RAM 201 typically comprises one or more DRAM modules such as DDR SDRAM. Alternatively, RAM 201 can include another type of device, or multiple devices, capable of storing data for processing by CPU 200 now-existing or hereafter developed. CPU 200 can access and manipulate data in RAM 201 via bus 208.

Storage 202 can include executable instructions 202A and application files 202B along with other data. Executable instructions 202A can include, for example, an operating system and one or more application programs for loading in whole or part into RAM 201 and to be executed by CPU 200. The operating system can be, for example, a Windows, Mac OS X, and/or Linux operating system. The application program can include, for example, a web browser, web server, and/or database server. Application files 202B can, for example, include user files, database catalogs, and configuration information. Storage 202 may comprise one or multiple devices and may utilize one or more types of storage, such as solid state or magnetic.

The internal configuration can also include one or more input/output devices, such as network 204 and display 206. Network 204 and display 206 can be coupled to CPU 200 via bus 208. Network 204 can, for example, provide a network interface to network 130 and may take the form of a wired network interface such as Ethernet or a wireless network interface. Other output devices that permit a user to program or otherwise use the client or server can be provided in addition to or as an alternative to display 206. When the output device is or includes a display, the display can be implemented in various ways, including by a liquid crystal display (LCD) or a cathode-ray tube (CRT) or light emitting diode (LED) display, such as an OLED display.

Other implementations of the internal architecture of clients and servers are also possible. For example, servers may omit display 206. The operations of CPU 200 can be distributed across multiple machines that can be coupled directly or across a local area or other network. RAM 201 or storage 202 can be distributed across multiple machines such as network-based memory or memory in multiple machines performing the operations of clients or servers. Although depicted here as a single bus, bus 208 can be composed of multiple buses.

Figure 3:
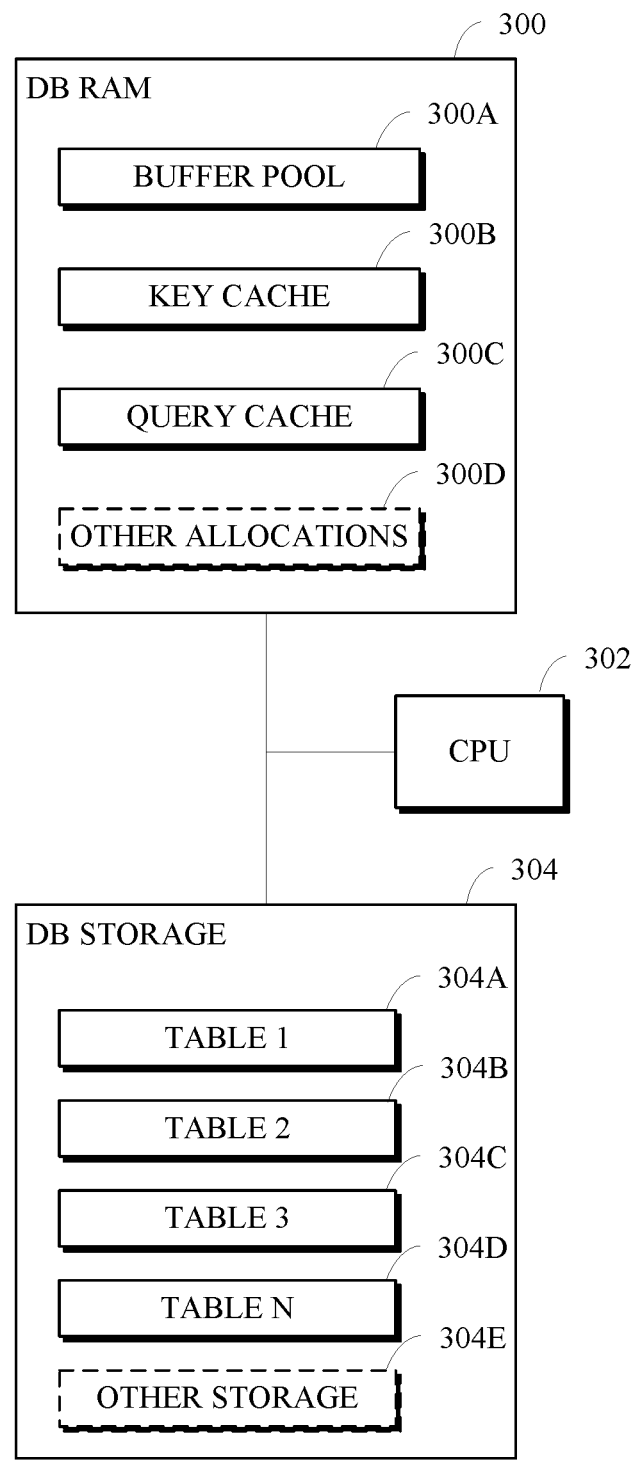
FIG. 3 is a block diagram of memory and storage usage of one example of a database.

FIG. 3 is a block diagram of memory and storage usage of one example of a database. The database may be a database instance DB located on one or more servers in a multi-tenant or single-tenant architecture. The database instance DB can be allocated RAM 300 and storage 304, which can be accessed and processed using CPU 302. RAM 300 can include a buffer pool 300A, key cache 300B, query cache 300C and other memory allocations 300D. Buffer pool 300A can be used to cache table and index database pages from storage 304. Query cache 300B can store some or all previous queries to the database to optimize processing of later similar or same queries. Key cache 300C can be used to store portions of database tables that may be accessed more often than other portions. Each of buffer pool 300A, query cache 300B and key cache 300C may be allocated a certain portion of RAM 300. The size of each allocation may differ, for example, buffer pool 300A may be allocated more RAM than query cache 300B, etc. Other allocations 400D can include other buffers or data structures used in the operation of database instance DB. For example, they may store results of instructions for notifications until they are published. The buffers and data structures used in an implementation of a database instance may vary and may include fewer or additional buffers than described here.

Storage 304 can include storage of table data including Tables 1 to N 304A-304D. The number of tables can vary and can number in the thousands, for example. Storage 304 can also include other storage 304E for storing other data used by the database instance DB, for example configuration data, index data and other information used in the operation of the database instance DB. The database instance DB may be associated with any number of applications whose data is maintained in a hierarchical table structure, such as a relational database. In such a database, data is often located in one and only one table with other tables including references to the data in the single table so that an update in data in one table results in an update to all tables having references to the same data.

Figure 4:
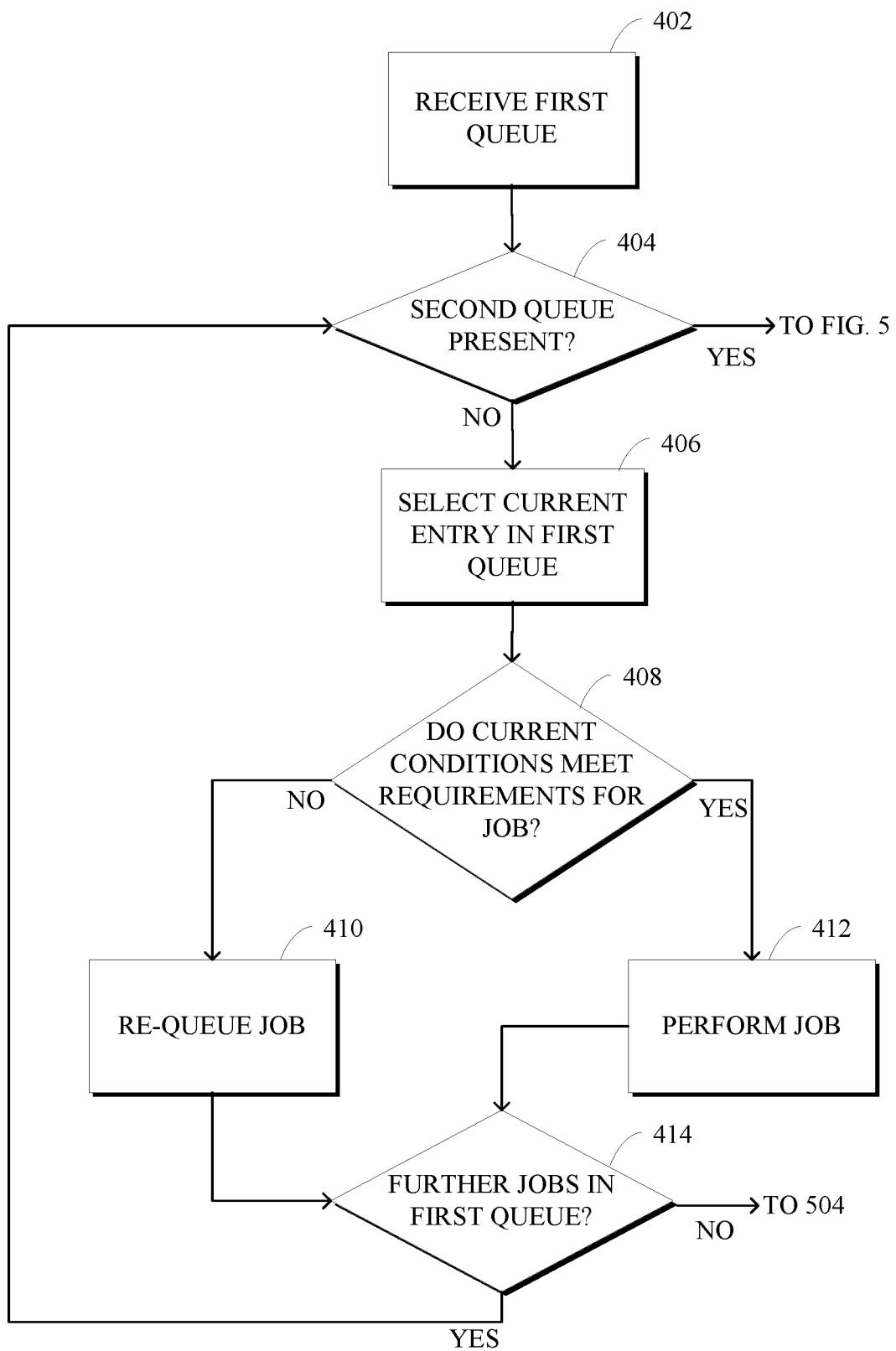
FIG. 4 is a flow chart of a method of operating a first queue of a queued scheduler according to the teachings herein.
Figure 5:
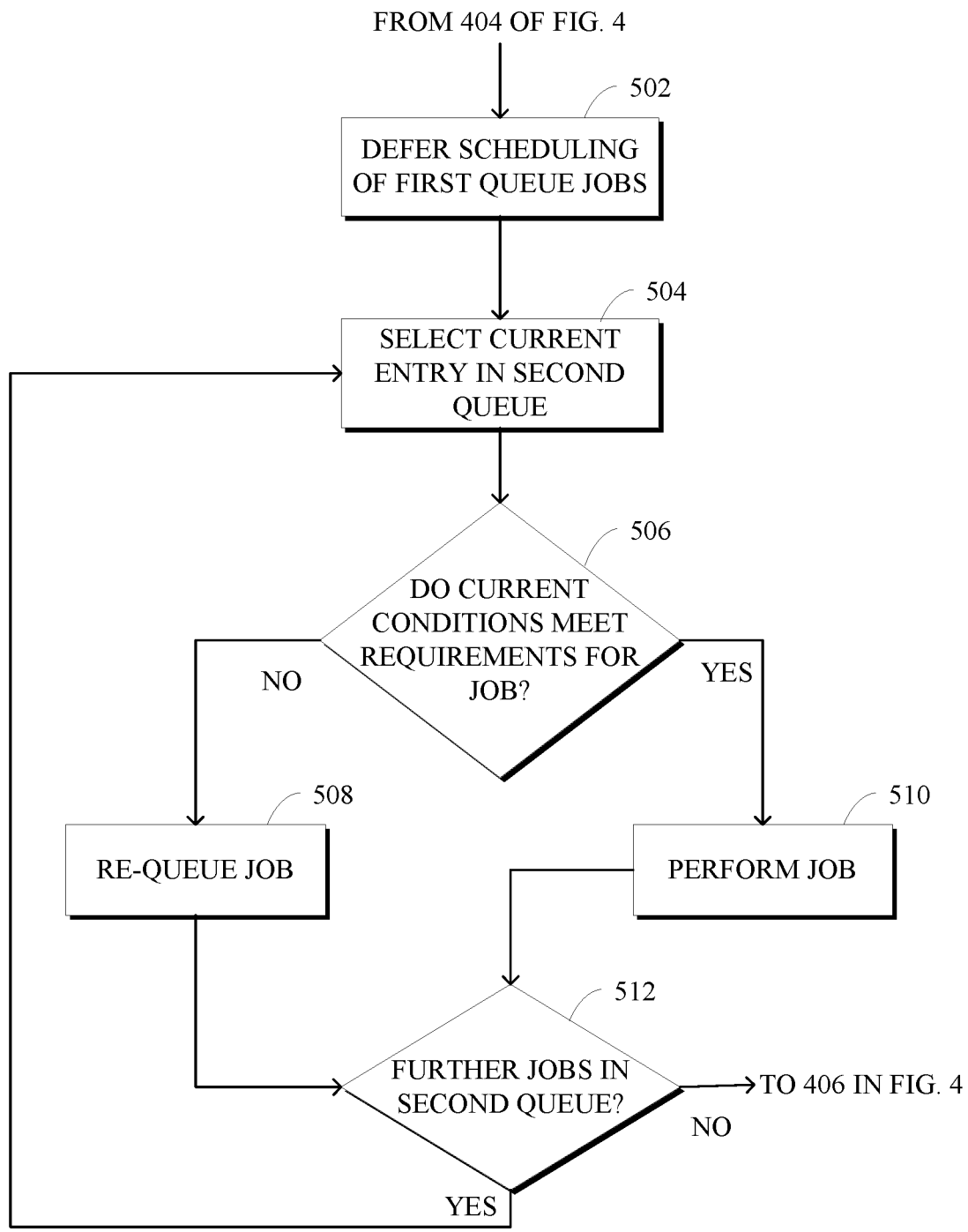
FIG. 5 is a flow chart of a method of operating a second queue of a queued scheduler according to the teachings herein.

FIG. 4 is a flow chart of a method of operating a first queue of a queued scheduler according to the teachings herein. FIG. 5 is a flow chart of a method of operating a second queue of a queued scheduler according to the teachings herein. The first queue and the second queue operate in conjunction with each other as discussed below. The processing of FIGS. 4 and 5 can be performed by CPU 200 or CPU 302, for example. The first queue may also be referred to as a periodic queue, while the second queue may also be referred to as an ad hoc queue.

At 402, the first queue is received. The first queue is received on a periodic basis, and the processing of FIG. 4 may be repeated periodically after receiving the first queue. For example, the first queue may be received daily, weekly, monthly or otherwise, and the processing of FIG. 4 may occur every 10 seconds so that it can be determined whether or not there are entries in the second queue or whether any time period allowed for processing the first queue has passed. The first queue includes a plurality of maintenance jobs for configuration items within a configuration management database. Each maintenance job includes a backup job. The backup job is generally the backup of stored data of a database instance, but it can include the backup of other stored data. The first queue initially has a defined order each time it is generated. The initial defined order may change over time as discussed hereinafter. The first queue may be generated by an administrator in one example.

The first queue may be populated once per period (e.g., per day) at the start of a backup window. The start of the backup window is configurable. It may be midnight, 2 am, or another time specified by a user or system operator. It may also include a day in addition to a time when the period is longer than a day. The first queue is populated based on one of a set of algorithms. For example, certain maintenance jobs or their associated backup may be designated as a priority. One or more jobs may be designated as a priority such that they are included before any remaining jobs in the first queue. The remaining jobs in the first queue may then be ordered according to other algorithms. For example, the maintenance jobs may be ordered by the size of the database to be backed up. This may be from the largest to the smallest or from the smallest to the largest. In another implementation, natural order (essentially random) may be specified after the priority jobs. In yet another implementation, all jobs are arranged according to the algorithm without any designation of priority jobs.

At 406, the method proceeds to process the first queue in the defined order by selecting the current entry in the first queue (here, the first entry). Before processing of the current entry proceeds, it is determined at 404 whether the second queue is present. This occurs because processing of the second queue takes precedence over processing the first queue such that processing the second queue defers scheduling of unscheduled maintenance jobs within the first queue until no entries remain within the second queue or no entry within the second queue can be processed at the time of selection of the current entry in the first queue. In this case, the first queue can continue processing at 408. Otherwise, the method of FIG. 4 ends until the second queue allows scheduling of the first queue to proceed as discussed with respect to FIG. 5.

At 408, the requirements for performing the maintenance job associated with the current entry are compared to conditions occurring within the configuration management database. A match may also be referred to as meeting resource constraints. The conditions or resource constraints can vary depending on the system in which the teachings herein are implemented and are generally tied to a database backup job associated with the maintenance job. Some examples of conditions or resource constraints are as follows.

One condition may be that only N simultaneous backup jobs can be destined for a single backup server (also called a network/disk I/O constraint), which another may be that only M simultaneous backup jobs can be running against a single database server (also called a CPU/memory constraint). Another condition can be that no database is backed up more than once concurrently. This may be referred to as a locking constraint. Certain tasks running against a database may also prevent the backup, and hence the maintenance job, from occurring. For example, if a database text dump is occurring for a later restoration, backup may not occur. Another condition is that sufficient disk space is available on some backup server to hold the backup. This may also be referred to as a space constraint. The database to be backed up and the host server of the database are healthy is another condition that may be imposed on performing the job. Other conditions related to system configuration may be imposed. For example, a setting that allows the database to be backed up and a setting that allows backup dispatch may be enabled as part of the conditions. The one or more backup jobs that are considered as part of the conditions may be associated with respective maintenance jobs scheduled and being performed from the first queue, the second queue, or both.

Other externally determined constraints may be imposed. These could include cloning, repairs, disk space requirements, etc.

When the conditions do not meet the requirements at 408, the maintenance job may be re-queued for a later attempt at 410. For example, the maintenance job may be moved to the end of the first queue for another attempt during the processing period of FIG. 4. The processing period of FIG. 4 is time limited by the frequency at which the first queue is received, and may encompass a shorter period of time. This re-queueing ends the processing of the current entry. In contrast, when the conditions meet the requirements at 408, the backup job associated with the maintenance job may be performed by copying data stored within a first non-transitory storage medium to a second non-transitory storage medium at 412. A first step in performing the maintenance job may include scheduling the backup job by adding the information related to the copying, such as the first non-transitory storage medium, the second non-transitory storage medium, and the memory requirements of the data to a list for use in the query of 408 that is removed once the backup job is completed. Once the job is scheduled and started, processing of the current entry ends.

At 414, a query is made as to whether there are further jobs in the first queue once the processing of the current entry ends. Another test may also determine whether the processing period is done. Even if there are further jobs, processing of the first queue may end if the processing period has passed. If there are further jobs in the first queue, and the processing period for the current first queue has not passed, the method returns to 406 to select the next entry in the first queue as the current entry for processing if there are no entries in the second queue at 404 (i.e., if the second queue is not present). If there are no further entries in the first queue, the method of FIG. 4 ends. Processing advances to 504 in FIG. 5 as discussed below. Entries, if any, added to the second queue are processed until the next first queue is received to again start the method of FIG. 4.

The second queue processed in FIG. 5 may also be referred to as an ad hoc queue because jobs are entered on an as-needed basis, either manually by a technician or automatically in response to changing system conditions. The second queue is populated by at least one maintenance job at any time. The at least one maintenance job is received either during processing the first queue, or before or after the first queue is processed. Each maintenance job forms a respective entry within a second queue. The entries in the second queue are initially ordered by receipt of a request for a maintenance job. In an implementation discussed herein, the second queue is sampled to determine whether there are any entries on a periodic basis such as every 10 seconds as discussed with respect to FIG. 4. In other implementations in accordance with the teachings herein, the addition of an entry into the second queue may prompt the start of processing the second queue. For example, receipt of a new entry into the second queue while the first queue is being processed as described in FIG. 4 may result in a response to the query at 404 that starts the processing of FIG. 5 at 502. Otherwise, receipt of a new entry into the second queue may result in the processing of FIG. 5 starting at 504. While the At 502, scheduling of first queue jobs is deferred. In some implementations, if a backup job associated with a maintenance job of the first queue is being scheduled or has already been scheduled when a job reaches the second queue, that scheduling may be completed and/or the start of the scheduled back up job initiated, before processing entries or jobs in the second queue.

At 504, the current entry in the second queue is selected in the order received. At 506, a query is made as to whether the current conditions meet the requirements for the job. That is, the requirements for performing a maintenance job associated with the current entry are compared to conditions occurring within the configuration management database. These conditions may include a status of processing the first queue, including what back up jobs within the entries of the first queue are currently being processed. The conditions used in the query of 506 may be the same as those used in the query of 408, or may be different depending on preferences of the system operator.

When the conditions do not meet the requirements, the current entry of the second queue may be moved to the end of the second queue (i.e., re-queued) without performing the maintenance job at 508. Alternatively, when the conditions meet the requirements, the maintenance job associated with the current entry may be performed at 510.

Processing the second queue defers scheduling of unscheduled maintenance jobs in the first queue until no entries remain within the second queue or the conditions meet the requirements of no entry within the second queue. For example, after 508 or 510, a query occurs as to whether further jobs are in the second queue at 512. If not, the method of FIG. 5 allows scheduling of unscheduled jobs of the first queue by advancing to 406. Otherwise, the next entry within the second queue is selected as the current entry for processing at 504. Although FIG. 5 does not expressly show such a feature, a counter or other means of keeping track of which entries are considered and re-queued may be used so as to prevent an endless loop when no job within the second queue can be performed.

According to the teachings herein, computing devices of the system architecture may be used to schedule thousands of database backups every day.

Some portions of above description include disclosure presented in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality. It should be noted that the process steps and instructions of implementations of this disclosure could be embodied in software, firmware or hardware, and when embodied in software, could be downloaded to reside on and be operated from different platforms used by real time network operating systems. Not all steps are required to practice the invention and additional steps may be included. Further, steps may be performed in different orders, including simultaneously.

Unless specifically stated otherwise as apparent from the above discussion, it is appreciated that throughout the description, discussions utilizing terms such as "processing" or "performing" or "determining" or "comparing" or the like, refer to the action and processes of a computer system, or similar electronic computing device, that manipulates and transforms data represented as physical (electronic) quantities within the computer system memories or registers or other such information storage, transmission or display devices.

Implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

For example, one or more computing devices can include an ASIC or programmable logic array such as a field-programmable gate array (FPGA) configured as a special-purpose processor to perform one or more of the operations or steps described or claimed herein. An exemplary FPGA can include a collection of logic blocks and random access memory (RAM) blocks that can be individually configured and/or configurably interconnected in order to cause the FPGA to perform certain functions. Certain FPGA's may contain other general or special purpose blocks as well. An exemplary FPGA can be programmed based on a hardware definition language (HDL) design, such as VHSIC Hardware Description Language or Verilog.

Implementations or portions of implementations of the above disclosures can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An apparatus for maintaining computing assets implementing configuration items within a configuration management database, comprising:
   memory; and
   a processor configured to execute instructions stored in the memory to:
   receive, on a periodic basis, a first queue including a plurality of first queue maintenance jobs for configuration items within a configuration management database, the first queue initially having a defined order and at least some of the plurality of first queue maintenance jobs including a backup job for data stored within a non-transitory storage medium;
   process the first queue starting with a first queue entry in the defined order;
   receive, while processing the first queue, a second queue maintenance job forming a respective entry within a second queue, the second queue initially ordered by receipt of a request for the second queue maintenance job, and wherein processing of the second queue has a higher priority than processing of the first queue; and
   in response to receiving the second queue maintenance job and after completion of a first queue maintenance job of the plurality of first queue maintenance jobs, process the second queue in sequence by, for a second queue entry:
      comparing requirements for performing the second queue maintenance job to conditions occurring within the configuration management database, wherein the second queue maintenance job is associated with the second queue entry and the conditions occurring within the configuration management database include a status of processing the first queue;
      when the conditions meet the requirements, performing the second queue maintenance job by copying data stored within a first non-transitory storage medium to a second non-transitory storage medium; and
      when the conditions do not meet the requirements, moving the second queue entry to an end of the second queue without performing the second queue maintenance job; and
   wherein processing the second queue defers processing of the first queue until no second queue entries remain within the second queue or the conditions meet the requirements of no second queue entry within the second queue.

2. The apparatus of claim 1, wherein the processor is configured to execute instructions stored in the memory to process the first queue in the defined order by, for the first queue entry within the first queue:
   comparing requirements for performing the first queue maintenance job of the plurality of first queue maintenance jobs to conditions occurring within the configuration management database, wherein the first queue maintenance job includes a respective backup job for data stored within the non-transitory storage medium;
   when the conditions meet the requirements, performing the backup job of the first queue maintenance job; and
   when the conditions do not meet the requirements, ending processing of the first queue entry.

3. The apparatus of claim 2, wherein the processor is configured to execute instructions stored in the memory to, after ending processing of the first queue entry when the conditions do not meet the requirements, moving the first queue entry to an end of the first queue.

4. The apparatus of claim 2, the processor is configured to execute instructions stored in the memory to process the first queue for a processing period, the processing period being less than the periodic basis.

5. The apparatus of claim 1, wherein the first non-transitory storage medium is associated with a first database server and the second non-transitory storage medium is associated with a second database server, and the conditions do not meet the requirements when resource constraints of at least one of the first database server or the second database server are not met.

6. The apparatus of claim 5, wherein the resource constraints of the second database server are not met when copying the data to the second non-transitory storage medium would exceed a maximum number of simultaneous backup jobs destined for the second database server.

7. The apparatus of claim 5, wherein the resource constraints of the second database server are not met when copying the data to the second non-transitory storage medium would exceed a maximum disk space available for data storage at the second database server.

8. The apparatus of claim 5, wherein the resource constraints of the first database server are not met when copying the data from the first non-transitory storage medium would exceed a maximum number of simultaneous backup jobs running against the first database server.

9. The apparatus of claim 1, wherein the status of processing the first queue comprises a status of a respective backup job of a first queue maintenance job of the first queue maintenance jobs associated with the first queue entry of the first queue.

10. The apparatus of claim 1, wherein the processor is configured to execute instructions stored in the memory to continue processing the first queue while performing the second queue maintenance job, and when processing the second queue no longer defers processing of maintenance jobs within the first queue.

11. A method of maintaining computing assets implementing configuration items within a configuration management database, comprising:
receiving, on a periodic basis, a first queue including a plurality of first queue maintenance jobs for configuration items within a configuration management database, the first queue initially having a defined order and at least some of the plurality of first queue maintenance jobs including a backup job;
processing the first queue starting with a first queue entry in the defined order by, for the first queue entry within the first queue:
comparing requirements for performing a first queue maintenance job of the plurality of first queue maintenance jobs associated with the first queue entry to conditions occurring within the configuration management database, wherein the first queue maintenance job includes a respective backup job for data stored within the non-transitory storage medium;
when the conditions meet the requirements, performing the backup job of the first queue maintenance job by copying data stored within a first non-transitory storage medium to a second non-transitory storage medium; and
when the conditions do not meet the requirements, ending processing of the first queue entry;
receiving, while processing the first queue, a second queue maintenance job forming a respective entry within a second queue, the second queue initially ordered by receipt of a request for the second queue maintenance job, and wherein processing of the second queue has a higher priority than processing of the first queue; and
in response to receiving the second queue maintenance job and after completion of the first queue maintenance job of the plurality of first queue maintenance jobs, processing the second queue in sequence by, for a second queue entry within the second queue:
comparing requirements for performing the second queue maintenance job to the conditions occurring within the configuration management database wherein the second queue maintenance job is associated with the second queue entry;
when the conditions meet the requirements, performing the second queue maintenance job associated with the second queue entry; and
when the conditions do not meet the requirements, moving the second queue entry of the second queue to an end of the second queue without performing the second queue maintenance job associated with the second queue entry;
wherein processing the second queue defers processing of the first queue until no entries remain within the second queue or the conditions meet the requirements of no entry within the second queue.

12. The method of claim 11, wherein the periodic basis is daily and processing the first queue occurs during only a fraction of a day even if an entry remains within the first queue at a time the fraction of the day passes.

13. The method of claim 11, wherein the defined order comprises a portion of the plurality first queue maintenance jobs designated as a priority followed by any remaining jobs.

14. The method of claim 13, wherein the remaining jobs are arranged within the first queue from a largest database backup job to a smallest database backup job.

15. The method of claim 13, wherein the remaining jobs are arranged within the first queue from a smallest database backup job to a largest database backup job.

16. The method of claim 13, wherein the remaining jobs are arranged randomly.

17. A method of maintaining computing assets implementing configuration items within a configuration management database, comprising:
receiving, on a periodic basis, a first queue including a plurality of first queue maintenance jobs for configuration items within a configuration management database, the first queue initially having a defined order and at least some of the plurality of first queue maintenance jobs including a backup job;
processing the first queue starting with a first queue entry in the defined order;
receiving, while processing the first queue, a second queue maintenance job forming a respective entry within a second queue, the second queue initially ordered by receipt of a request for the second queue maintenance job, and wherein processing of the second queue has a higher priority than processing of the first queue;
in response to receiving the second queue maintenance job and after completion of a first queue maintenance job of the plurality of first queue maintenance jobs, begin processing the second queue unless a backup is occurring while processing the first queue that prevents any backup job associated with the second queue maintenance job within the second queue from occurring, wherein processing the second queue comprises, for a second queue entry within the second queue:
performing the backup job of the second queue maintenance job by copying data stored within a first non-transitory storage medium to a second non-transitory storage medium; and
deferring processing of the first queue until no entries remain within the second queue or no entry within the second queue can be processed.

18. The method of claim 17, wherein processing the first queue in the defined order comprises, for each first queue entry within the first queue until a processing period has passed:
comparing requirements for performing the first queue maintenance job of the plurality of first queue maintenance jobs to conditions occurring within the configuration management database;

when the conditions meet the requirements, performing a backup job of the first queue maintenance job by copying data stored within a third non-transitory storage medium to a fourth non-transitory storage medium; and when the conditions do not meet the requirements, ending processing of the first queue entry.

19. The method of claim 17, wherein processing the second queue comprises, for the second queue entry in the second queue:

moving the second queue entry to an end of the second queue without performing the second queue maintenance job until conditions occurring within the configuration management database meet requirements for performing the second queue maintenance job.

20. The method of claim 17, further comprising:

resuming processing the first queue while performing the second queue maintenance job, and when processing the second queue no longer defers processing of the first queue.

* * * * *